United States Patent
Sprague et al.

[11] Patent Number: 5,661,652
[45] Date of Patent: Aug. 26, 1997

[54] MOBILE NETWORK WITH AUTOMATIC POSITION REPORTING BETWEEN MEMBER UNITS

[75] Inventors: David S. Sprague, Portola Valley; Arthur N. Woo, Cupertino, both of Calif.

[73] Assignee: Trimble Navigation Limited, Sunnyvale, Calif.

[21] Appl. No.: 447,607

[22] Filed: May 23, 1995

Related U.S. Application Data

[63] Continuation-in-part of Ser. No. 199,726, Feb. 22, 1994, Pat. No. 5,422,816.

[51] Int. Cl.⁶ .................................................. H04B 1/44
[52] U.S. Cl. ........................... 364/449.7; 364/448
[58] Field of Search ........................... 364/446, 448, 364/449, 460, 449.7; 342/357, 457; 340/825.44, 825.49

[56] References Cited

U.S. PATENT DOCUMENTS

| | | | |
|---|---|---|---|
| 4,644,351 | 2/1987 | Zabarsky et al. | 340/825.44 |
| 5,153,836 | 10/1992 | Fraughton et al. | 364/461 |
| 5,418,537 | 5/1995 | Bird | 342/357 |
| 5,461,390 | 10/1995 | Hoshen | 342/419 |
| 5,506,886 | 4/1996 | Maine et al. | 379/57 |
| 5,519,403 | 5/1996 | Bickley et al. | 342/352 |
| 5,539,395 | 7/1996 | Buss et al. | 340/827 |
| 5,546,422 | 8/1996 | Yokev et al. | 375/202 |

*Primary Examiner*—Michael Zanelli
*Attorney, Agent, or Firm*—Thomas E. Schatzel

[57] ABSTRACT

A network comprises a plurality of GPS navigation receivers with two-way radio data communication for communicating the current computed positions of individual mobile units to other mobile units in the network and to stationary dispatch controllers connected in by the public switched telephone network. Ordinary telephone personal pager service is carried out transparently in the network for non-GPS equipped mobile units.

5 Claims, 2 Drawing Sheets

MOBILE NETWORK WITH AUTOMATIC POSITION REPORTING BETWEEN MEMBER UNITS

This is a continuation-in-part of application Ser. No. 08/199,726 filed of Feb. 22, 1994, now U.S. Pat. No. 5,422,816.

BACKGROUND OF THE INVENTION

1. Field of the Invention

The invention relates generally to navigation equipment and more specifically to combinations of portable global positioning system receivers and two-way telephone personal pagers.

2. Description of the Prior Art

Voice mail and pagers are now encountered by most people who use a telephone in the United States. Ordinary pagers allow the telephone numbers of callers who left a call-back number to be digitally broadcast to all the pagers in a service area by a pager hub station. The particular pager subscriber being called is the only one that sees the call-back number on their display. A serial number is used to sort through all the broadcasts and to select only those intended for a particular subscriber. Some pagers allow short text messages to be included with the call-back number. A derivative service broadcasts stock quotes to its subscribers that have ticker-tape stock displays in their mobile pocket units.

A new two-way pager service will allow pager subscribers to communicate back to the pager hub. Short messages can be encoded for delivery by the pager hub to another pager or a telephone number.

In a seemingly unrelated part of the present technology environment, global positioning system (GPS) receivers conventionally compute the navigational position of the receiver itself. In certain group settings where the positions of various remote or mobile stations needs to be constantly updated, e.g., to a dispatcher, such positions are commonly reported periodically by voice over a radio channel in layman's terms, such as street addresses or highway intersections.

Many business, technical and military organizations could benefit from an automatic method of collecting the position of each individual remote station and any base station and by the distributing of such member network positions to all. For example, public safety would benefit if police and fire dispatchers were equipped with GPS receiver base stations that could receive the current positions periodically of squad cars and fire engines. Other dispatching functions, such as parcel pick-up and delivery could also better coordinate their assets and service where the location of mobile units were readily available.

SUMMARY OF THE PRESENT INVENTION

It is therefore an object of the present invention to provide a GPS network in which individual GPS receivers communicate their respective absolute positions to other units in the network or to a command base station.

It is another object of the present invention to provide a GPS receiver that reports its position automatically via a two-way radio link to other GPS receivers.

It is a further object of the present invention to provide a GPS receiver with a portable two-way pager.

Briefly, a network embodiment of the present invention comprises a plurality of GPS navigation receivers with two-way radio data communication for communicating the current computed positions of individual mobile units to other mobile units in the network and to stationary dispatch controllers connected in over the public switched telephone network.

An advantage of the present invention is that a GPS receiver is provided that communicates its absolute position for use by other mobile units and stations.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
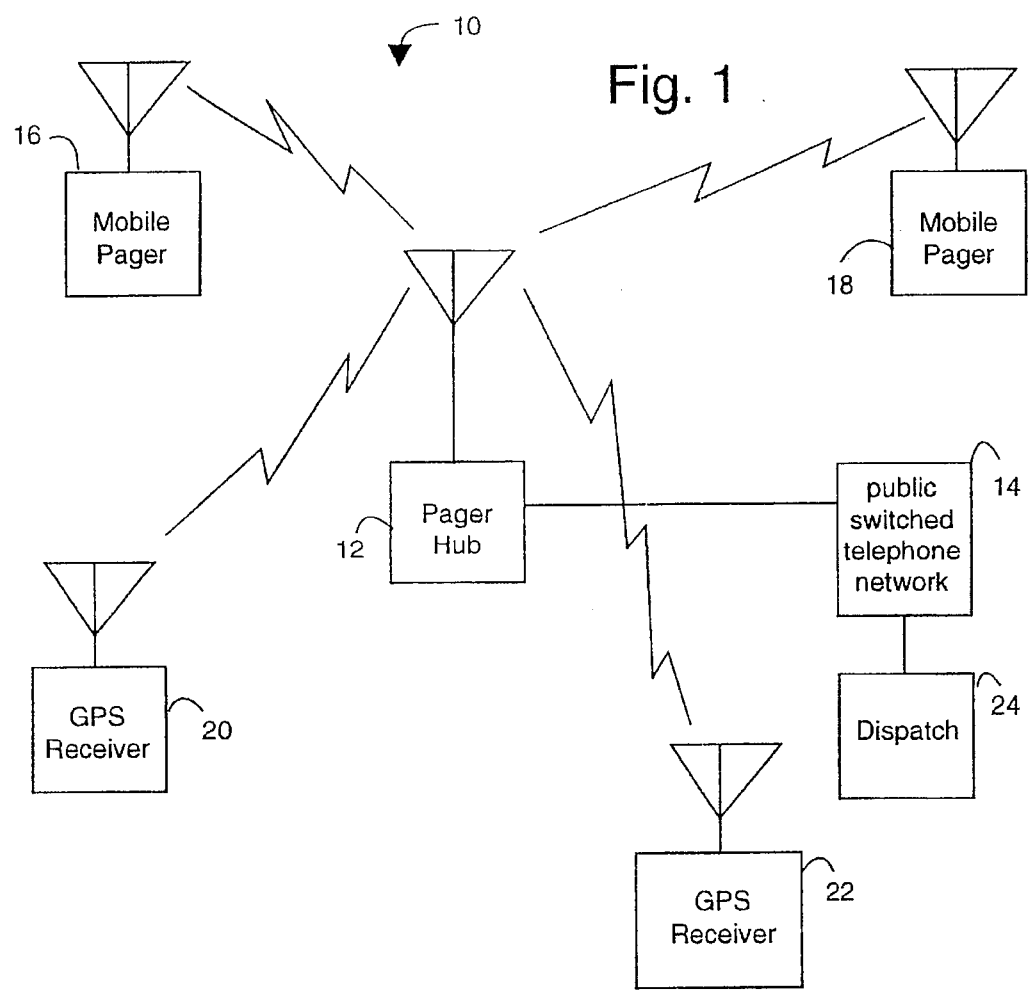
FIG. 1 is a block diagram of a mobile network embodiment of the present invention.

FIG. 1 illustrates a mobile network embodiment of the present invention, referred to herein by the general reference numeral 10. A fixed land service personal pager hub station 12 is located in a local region and is connected to the public switched telephone network (PSTN) 14. The pager hub station 12 is part of the universal two-way radio personal pager system now common in the United States and elsewhere, and is more fully described in U.S. Pat. No. 4,644,351, issued Feb. 17, 19987, to Zabarsky, et al., and incorporated herein by reference. In ordinary service, the station 12 communicates with a large number of mobile pocket-sized personal pagers, represented in FIG. 1 by a pair of pagers 16 and 18, as described by Zabarsky, et al. Such pagers are defined as self-contained data terminals capable of two-way communication of messages and destination addresses. Common experience is that pagers are small enough to be carried in a shirt pocket and run on batteries.

Callers on the PSTN are able to leave messages and call-back numbers on the pagers 16 and 18 that are communicated digitally and presented on a display on the pager itself. Such messages are steered to a particular pager 16 or 18 by virtue of a unique serial number attached to the pager and a unique access number provided to the PSTN. More importantly, the pagers 16 and 18 can formulate and communicate messages between themselves.

A pair of GPS navigation receivers 20 and 22 receive microwave signals from a constellation of orbiting GPS satellites (not shown) that transmit range and time information. The GPS navigation receivers 20 and 22 also transmit and receive pager messages on the frequencies and using the protocols of the pagers 16 and 18. Each GPS navigation receiver 20 and 22 computes its earth position by triangulation of the microwave signals from the GPS satellites. The position determined by GPS receiver 20 is communicated via pager hub station 12 to GPS receiver 22 and stored as a waypoint associated with GPS receiver 20. Conversely, the position determined by GPS receiver 22 for itself is communicated via pager hub station 12 to GPS receiver 20 and stored as a waypoint associated with GPS receiver 22.

Conventional waypoint course guidance and goal tracking are used for GPS receivers 20 and 22 to find one another. It is also possible for the messages from GPS receivers 20 and 22 to be communicated to a dispatch station 24, e.g., a police or trucking company dispatcher that may be located outside the pager service area.

Figure 2:
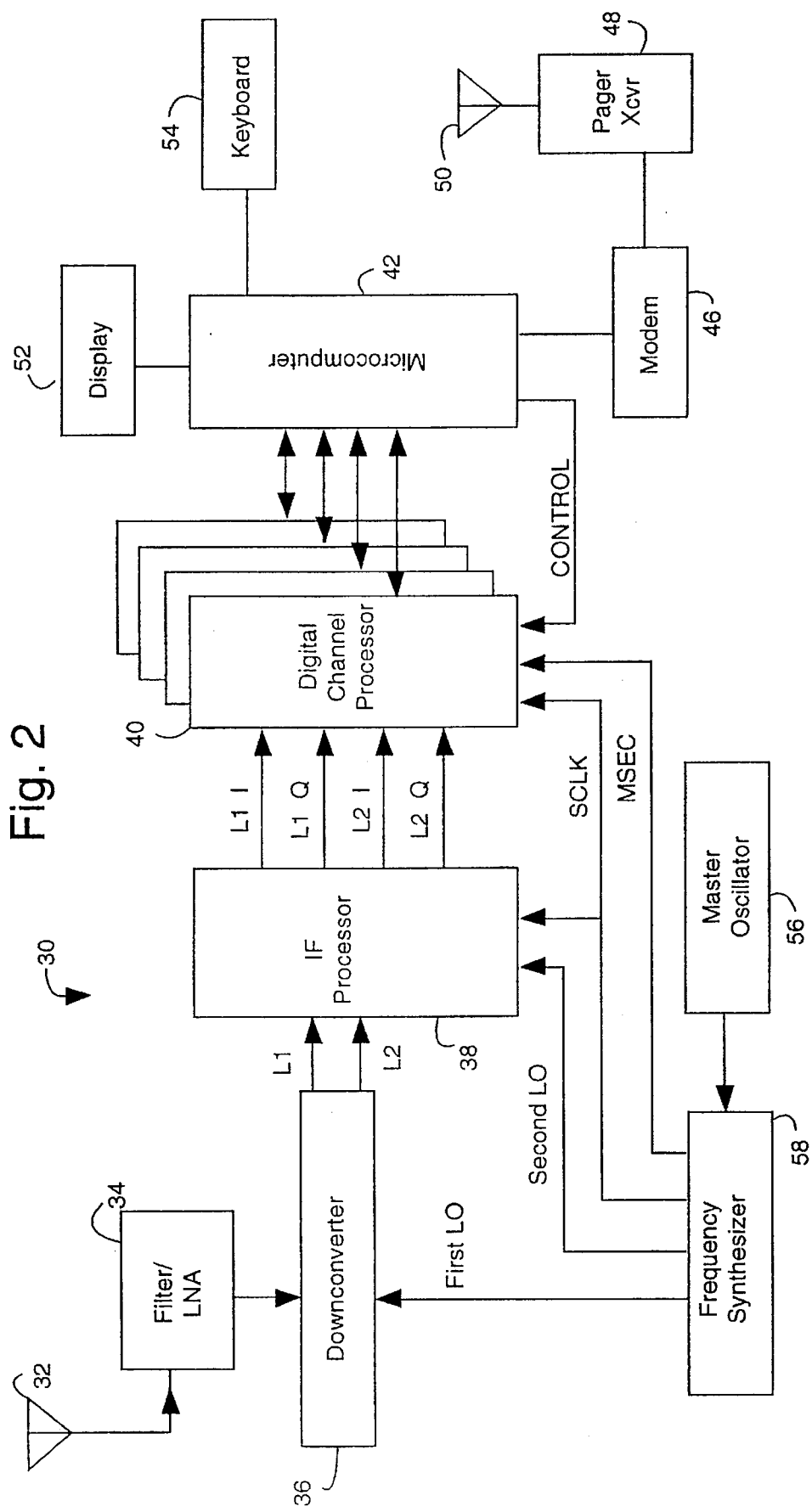
FIG. 2 is a block diagram of one of the GPS receivers with an internal pager transceiver of the mobile network of FIG. 1.

FIG. 2 illustrates a global positioning system (GPS) navigation satellite receiver embodiment of the present invention, referred to by the general reference numeral 30. Orbiting GPS satellites transmit L-band microwave GPS signals "L1" and "L2" which are received by a dual-frequency microstrip antenna 32 and are then filtered and amplified by a low noise amplifier (LNA) 34. The satellite signal is then frequency translated to lower, intermediate frequency by a downconverter 36. The output of the downconverter 36 is further frequency translated by an IF processor 38 before being digitized, with inphase (I) and quadrature (Q) components of both L1 and L2 signals. The resulting digitized output of the IF processor 38 is fed to a multiplicity of digital channel processors 40, where each digital channel processor 40 is designed to track the code and carrier signals on L1 and L2 of a particular satellite. A number "N" of digital channel processors 40 are present, which leads to a capability of tracking "N" satellites using both L1 and L2 signals. A microcomputer 42 participates in closing the code and carrier tracking loops and in performing code and carrier phase measurements, as well as other functions.

A modem 46 formats and deformats two-way digital messages in pager service protocol for communication with the hub station 12. Zabarsky, et al., supra, describe acceptable protocols. A two-way radio transceiver 48 is connected to the modem 46 to carry the pager service digital protocol information. Such radio transceiver is conventional and ordinarily implemented in commercially-available two-way paging executive, e.g. as marketed by Motorola (Schaumberg, Ill.). An antenna 50 is connected to the radio transceiver 48.

A display 52, e.g., a liquid crystal display (LCD) panel, is controlled by the microcomputer 42. Position determinations and system messages are presented on the display 52 for reading by a user. A keyboard 54 allows a user to input messages for other GPS receivers 20 and 22 or the dispatcher 24 to the microcomputer 42.

Preferably, all the elements of FIG. 2 and a battery to power them are included in a single handheld unit for personal use in a mobile environment. Microcomputers which are conventionally included in prior art GPS portable receivers are expected to have enough reserve processor capacity to do double duty and service the modem 46 and pager transceiver 48.

Although FIG. 2. illustrates a dual-frequency (L1 and L2) GPS receiver, a single-frequency receiver can be used instead and will also produce good results, e.g., the SCOUT and SCOUTMASTER, as marketed by Trimble Navigation (Sunnyvale, Calif.).

In the filter-LNA 34, the combined L1/L2 signal from the antenna 32 is power split, separately filtered in L1 and L2, power combined into a single L1/L2 signal again and then amplified. A master oscillator 56 includes a ten MHz crystal oscillator which is then divided by two to provide a five MHz signal to be used by the frequency synthesizer block. A frequency synthesizer 58 synthesizes both local oscillator and clock signals to be used elsewhere in the receiver. The frequency synthesizer 58 includes a feedback loop which phase locks the output of a voltage controlled oscillator (VCO) to the five MHz signal. Frequency dividers are used to provide different frequencies that are used elsewhere in the receiver. A first local oscillator (LO) signal of 1400 MHz is used by the downconverter 36 for frequency translation. A second LO is used by the IF processor 38 for frequency translation. A sampling clock (SCLK) is used for digitization and subsequent digital channel processing. A millisecond (MSEC) clock is used by the receiver in a measure of local time reference.

The downconverter 36 frequency translates the incoming L1 (1575.42 MHz) and L2 (1227.6 MHz) signals. The L1/L2 input signal is power split before the L1 and L2 signals are separately mixed with the first local oscillator signal. The resultant mixer outputs are bandpass filtered before further amplification. The downconverter 36 outputs the L1 and L2 signals at carrier center frequencies of 175.42 MHz and 172.40 MHz, respectively.

The IF processor 38 further frequency translates the L1 and L2 signals, and provides outputs that are the inphase (I) and quadrature (Q) digitized samples of the L1 and L2 signals. The L1 and L2 signals are power split before being mixed with I and Q versions of the second local oscillator. The resulting mixer outputs are low pass filtered and amplified before being one bit quantized and sampled. A flip-flop is used to sample the signals at the rate of SCLK. The L1 output has digitized I and Q versions of the L1 satellite signals at a carrier center frequency of 420 KHz. The L2 output provides digitized I and Q versions of the L2 satellite signals at a carrier center frequency of 2.6 MHz.

Each digital channel processor 40 includes an L1 tracker and an L2 tracker. The L1 tracker helps process the L1 signal, by using the I-L1 and Q-L1 input signals. The L2 tracker facilitates processing of the L2 signal, and uses the I-L2 and Q-L2 input signals.

Incoming message packets from the radio transceiver that are sent from other similarly equipped mobile units are used to supply individual network member absolute positions and velocities, and this information is stored by user identification number as goal or waypoint equivalents. As such, distance-to-goal (DTG), estimated-time-of-arrival (ETA) and velocity-made-good (VMG) estimates are presented in a "target track screen" on the display 52.

The use of waypoints and goals in GPS systems is conventional, as are the methods and computer system techniques used to compute distance-to-goal, estimated-time-of-arrival and velocity-made-good estimates from a current GPS-determined absolute position and velocity to a waypoint or goal. Therefore, a detailed disclosure of such is unnecessary here. The present invention provides for the automatic input of network member absolute position, velocity and heading information and usurps the traditional waypoint and goal positions with these data. As a consequence, the waypoints and goals representing other users in a network of systems 30 are dynamic and in need of periodic updating. Such updating is carried on in background by the exchange of paging information.

Figure 3:
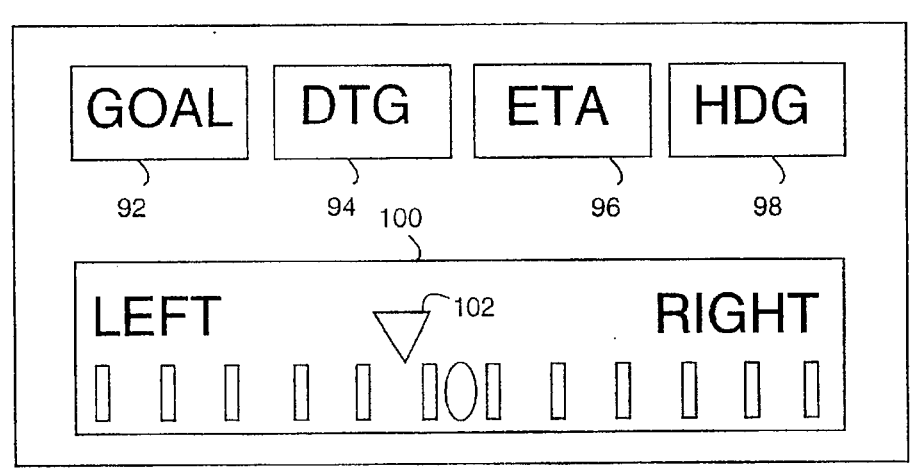
FIG. 3 illustrates a target track screen that may be represented on the display included in the GPS receiver of FIG. 2.

FIG. 3 illustrates a target track screen 90 that may be represented on display 52 (FIG. 2) by the microcomputer 42. The screen 90 is divided into sections. A section 92 is used to display a goal identification code, such as a user ID. A section 94 is used to display an estimated distance to goal (DTG) or a waypoint that has been selected by manipulating the keyboard 54 and computed by the microcomputer 42. Such a waypoint may, in fact, be the position of another GPS receiver 20 or 22, as communicated by radio link over hub station 12. A section 96 is used to display an estimated time of arrival (ETA) of the user to the selected waypoint, as computed by the microcomputer 42, given the velocity and heading of both the GPS receiver 20 or 22 and the waypoint involved, e.g., the other GPS receiver 20 or 22. A section 98 is used to display the heading to the goal. A gauge 100 is used to display the relative magnitude of left or right correctional heading change necessary for a user to converge on the selected goal. A cursor 102 moves left or right to indicate the required heading change to converge on the selected goal.

Whenever a message is to be transmitted to a particular pager 16 or 18, or GPS receiver 20 or 22, an address that is also transmitted with the message is used to check continuously-updated routing lists of which hub station 12 is most likely to be in contact with the addressee. A carrier frequency is selected for transmission of the message by the hub station 12. Typically a 4800 baud data rate and frequency shift keying (FSK) on 25K hertz channels is used. If the hub station 12 fails to receive an acknowledgment from the addressee, other carrier frequencies and other hub stations 12 are tried until contact can be established. A radio-fade tolerant data protocol is used with a random-delay contention for pager transmission and a continuous data stream for pager reception. Zabarsky, et al., describes this, and more, in greater detail, which may be used to implement network 10 and its constituents.

In a mobile dispatch system, such as a police communication system, it would be advantageous for each GPS receiver 20 and 22 to automatically and periodically compute and transmit their respective current positions to the dispatcher 24. Then depending on the respective locations of the GPS receivers 20 and 22, one would be selected to receive a private message from the dispatcher 24 for presentation on the corresponding display 52, e.g., a call to go to a particular near by location. In police helicopter chases of stolen cars, for example, both the units involved and the dispatcher would have a better idea on how to coordinate themselves when the respective positions are automatically reported in to each other and useable as waypoints.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A mobile dispatch network, comprising:

a plurality of global positioning system (GPS) receivers each capable of receiving microwave radio transmissions from orbiting GPS satellites that encode time and ranging information, and are each connected to convert said information to a current position local to each corresponding GPS receiver;

a plurality of pager transmitters each integrated within one of said GPS receivers and each connected to transmit a local current position as a first data message to said other GPS receivers to be recorded in the remote GPS receivers as a waypoint or goal back to the sourcing GPS receiver; and a plurality of pager receivers each integrated within one of said GPS receivers and each connected to receive a second data message representing a remote position of one other of said GPS receivers and connected to record such remote position locally as a waypoint or goal to said remote GPS receiver.

2. The network of claim 1, wherein:

each said GPS receiver includes a microcomputer connected to compute a heading and a distance to each received and recorded waypoint position related to each remote GPS receiver for presentation to a connected display.

3. The network of claim 1, wherein:

the pager transmitter and receiver communicate to corresponding pager receivers and transmitters of remote GPS receivers via an intermediate pager hub station connected to the public switched telephone network (PSTN), wherein said pager hub station broadcasts a continuous stream of messages and addresses for particular pager receivers according to a unique address and the pager transmitters coordinate with other transmitters.

4. The network of claim 3, further comprising:

a dispatcher connected via said PSTN to said pager hub station to receive the remote positions of the plurality of GPS receivers.

5. A mobile dispatch network, comprising:

a plurality of global positioning system (GPS) receivers each capable of receiving microwave radio transmissions from orbiting GPS satellites that encode time and ranging information, and are each connected to convert said information to a current position local to each corresponding GPS receiver;

a plurality of pager transmitters each integrated within one of said GPS receivers and each connected to transmit a local current position as a first data message to said other GPS receivers to be reached in the remote GPS receivers as a waypoint or goal back to the sourcing GPS receiver; and a plurality of pager receivers each integrated within one of said GPS receivers and each connected to receive a second data message representing a remote position of one other of said GPS receivers and connected to record such remote position locally as a waypoint or goal to said remote GPS receiver;

a microcomputer connected to compute a heading and a distance to each received and recorded waypoint position related to each remote GPS receiver for presentation to a connected display;

an intermediate pager hub station connected to the public switched telephone network (PSTN) and connected to communicate with the pluralities of the pager transmitters and receivers each associated with individual remote GPS receivers; and a dispatch connected to receive the remote positions of the plurality of GPS receivers via said PSTN to via the intermediate pager hub station.

* * * * *